3,138,073
PRECISION STROKE PISTON AND CYLINDER
Roger R. Whitehouse, Boalsburg, Pa., assignor to Centre Circuits, Inc., State College, Pa., a corporation of Pennsylvania
Filed Mar. 18, 1963, Ser. No. 265,708
10 Claims. (Cl. 92—13)

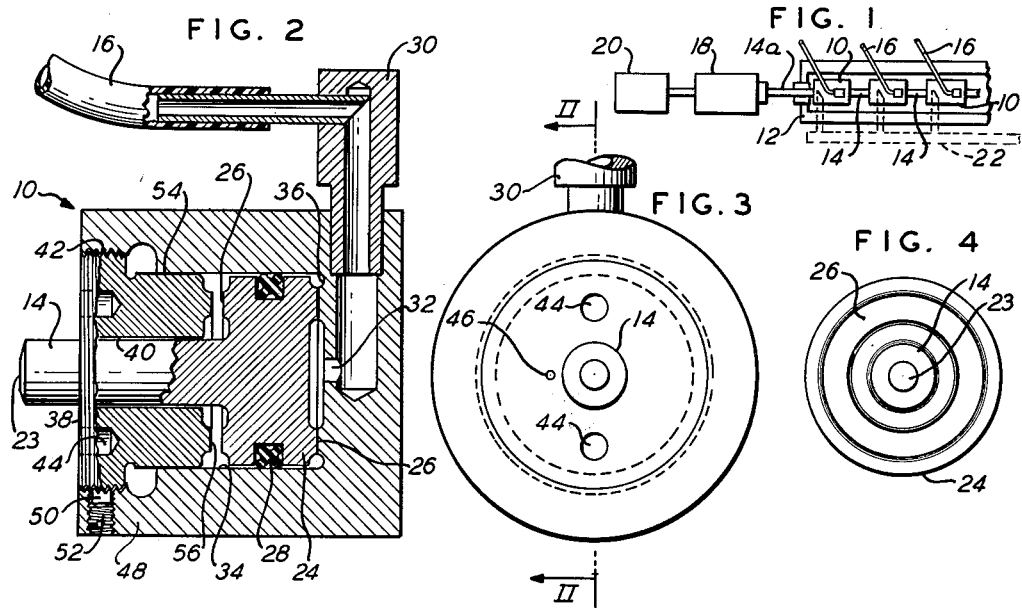
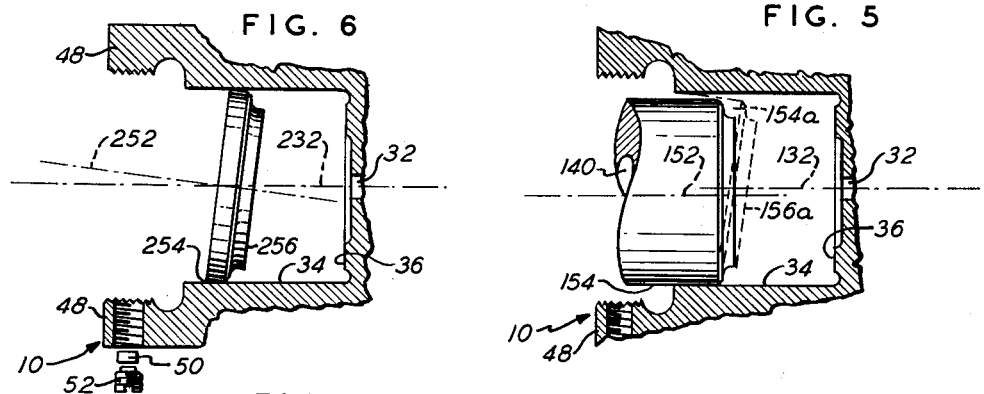
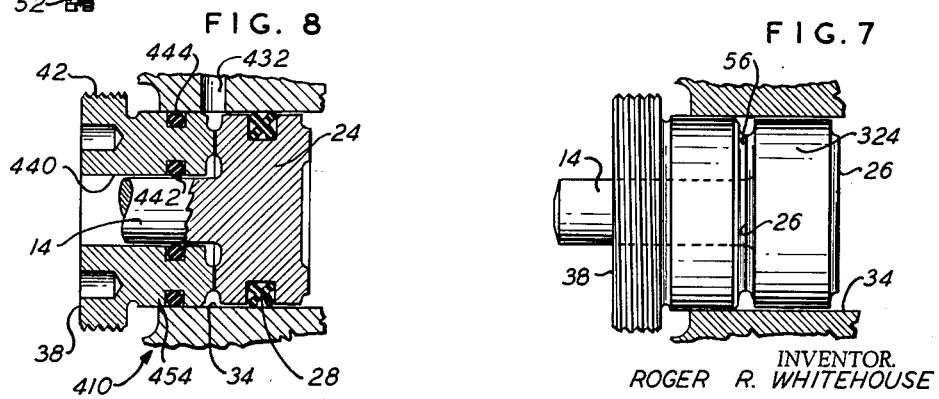

This invention relates in general to an adjustable stroke piston and cylinder.

It particularly relates to adjustable piston and cylinder devices having a precision stroke and especially adapted for use as the components of a decimal difference gage mechanism. Several such devices, connected in tandem to form the gage mechanism, can be selectively operated to establish, by appropriate permutations of adjustment and combinations, all gaged settings desired within any given decimal range.

Within the cylinder, the piston moves between a transverse interior face or wall providing a flat stop at one end of stroke, and another transverse interior face or wall providing a flat stop at the opposite end of stroke. The closed end of the cylinder forms one of these transverse faces and the customary head or cap at the head end of the cylinder forms the other such face.

A piston rod carried by the piston projects through an opening in the cylinder head to an external point, where the rod engages another cylinder or the ultimate device to be gaged by the mechanism. The decimal stroke provided when the cylinder is operated affords the requisite adjustment in the position of the other cylinder or the gaged device.

Adjustment of the effective length of the cylinder bore, so as to accurately predetermine the stroke of the piston therein, is accomplished by adjusting the cylinder head in the head end of the cylinder, to which the cylinder head is connected by loosely fitting threads. Rotation of the head in its threads allows the head to be pre-set to an accurate decimal reading and, in practice, the piston stroke can initially be set correct to within about twenty-millionths of an inch of the desired length.

As indicated, the head fits loosely in its threads, whereas a smooth cylindrical piloting portion carried by the head at its inner end fits tightly in surface contact within the same bore on which the piston slides in the cylinder. The inner end face of the piloting portion of the head provides one of the piston stops referred to and, as the head is threadably positioned in the cylinder, the tight fit of this portion in the bore forces the plane of said inner end face to remain precisely square with respect to the bore and further forces the piloting portion to be concentric in the bore at all times. The threaded portion of the head shifts diametrically in its threads so as to accommodate the squaring and centering function just noted and the threaded connection has the sole function of presetting the axial position of the head in the bore of the cylinder.

Once its position is set, the head is locked by suitable locking means to prevent further turning in the threads; thus the piston stroke is conclusively established and, in practice, the stroke repeatability achieved is to an accuracy of about ten-millionths of an inch throughout thousands of observed cycles of operation. Depending upon the system of measurement employed, e.g., the English system, the stroke setting is usually fixed at a value between 0.001" and 0.800", inclusive, which it will be appreciated is a comparatively small stroke; if readings to four decimal places are desired, then the value will be between 0.0001" and 0.8000", it being understood that the tandem connected cylinders of a given gage mechanism vary in stroke from cylinder to cylinder in order that, by satisfactory proportions and orders of strokes, the cylinders in properly selected combinations extensibly and retractively move to cover all points in a given decimal range.

The piston and cylinder units hereof find particular use in automatic gage mechanisms and are fluid operated cylinders, being double acting cylinders or, if single acting, they receive force for the return stroke from the load reaction or from a suitable return spring device which can be provided. The extent to which the piston and cylinder are provided with seals depends upon the selection of the operating fluid, which can be either hydraulic fluid or other liquid, or air or some other gas.

From the foregoing, it is apparent that a difficult internal squareness relation desired in cylinders is accomplished by this invention, whereby the interior cylinder faces or stops are precisely square to the common bore and maintain exact parallelism with one another in any position of advanced or retracted movement of the head with respect to that bore. It is a simple matter to form the opposite faces of the piston exactly parallel to one another; hence, the piston at opposite ends of its stroke establishes solid contact against the interior cylinder faces with the same uniformity, and without tendency to cock or vary, irrespective of the longitudinal position to which the head is adjusted in its threads. It is for this reason that the characteristics previously referred to can be readily achieved, namely, stroke setting with initial precision, and repeatability with high accuracy.

Further features, objects, and advantages will either be specifically pointed out or become apparent when, for a better understanding of the invention, reference is made to the accompanying drawing on which certain preferred embodiments are shown and in which:

FIGURE 1 is a plan view of a difference gage providing accurate settings at all points in a given decimal range and embodying a construction of pistons and cylinders according to the present invention;

FIGURE 2 is a longitudinal sectional view of a piston and cylinder unit taken along the lines II—II of FIGURE 3;

FIGURES 3 and 4 are end views respectively of the piston and cylinder unit and of the piston alone, both taken from the piston rod end;

FIGURES 5 and 6 are views corresponding to FIGURE 2, and showing, to exaggerated fashion, the results of a cylinder head piloting portion which is too small in diameter and too short longitudinally, respectively, in respect of its fit in the cylinder bore;

FIGURE 7 corresponds to FIGURE 2, but shows a single acting, seal-less modification of the invention; and FIGURE 8 shows a double acting modification, provided with the necessary seals between the fixed and moving parts.

More particularly in FIGURE 1 of the drawing, a portion of a difference gage mechanism is shown comprising a plurality of tandem-connected cylinders 10 which are slidably mounted in the gage frame 12. Each cylinder 10 carries a retractively and extensibly movable piston rod 14 protruding leftwardly therefrom, as viewed in FIGURE 1, toward an external point where it engages the rear end of the next adjacent cylinder. The extreme cylinder on the right, not shown, is fixed to the frame 12. The extreme cylinder 10 on the left end as viewed in FIGURE 1 undergoes the longest amount of slideable movement because it is farthest from the fixed cylinder; this cylinder has a longer piston rod 14a than the other cylinders.

The piston rod 14a slideably fits in a bearing fixed in the wall of the frame 12 and is connected at the end to move a device 18 adapted to be accurately positioned thereby, for example, a table stopping pawl. Although a loading device 20 can be provided, as illustrated, to constantly bias the positioned device 18 under pre-load to the right as viewed in FIGURE 1, the loading device 20 is not necessary in all cases; the loading device may be omitted if the cylinders are of the double acting type requiring, in addition to the regular pressure setting lines 16, a resetting manifold arranged as at 22 with flexible lines for communicating pressure to the opposite end of each cylinder from the end receiving the pressure lines 16.

The construction and operation of the overall difference gage mechanism and the table stopping pawl which is adjustably positioned thereby form no per se part of the present invention. An example of one such construction of gage and gaged pawl to which this invention applies is the type generally as shown and described in Benton and Whitehouse patent application U.S. Serial No. 216,653, filed August 13, 1962.

In FIGURES 2 and 4, each piston rod 14 has a reduced outer end presenting a flat 23 for abuttingly engaging the next cylinder. The piston rod 14 is integrally connected at its opposite end with a slideable piston 24. The piston 24 has a thickened rim presenting ring-shaped, transverse faces 26 which are longitudinally offset from the ends of the piston and which are radially offset from the longitudinal axis of the piston and rod 14. The piston faces 26 are precisely square to the rod 14 so as to be in parallel planes to one another. The piston 24 has a cylinder-engaging quadring seal 28 carried in an annular groove formed in the rim of the piston.

In FIGURES 2 and 3, the illustrated cylinder 10 containing the piston 24 is of the single acting type; a fitting 30 carried by the cylinder 10 is connected at one end to the adjacent pressure line 16 and is also connected to an inlet-outlet port 32 in the cylinder which communicates with one end of the cylinder bore 34. A longitudinally offset portion of the cylinder at that end of the bore 34 defines a transverse, ring-shaped face 36 engageable by, and acting as a stop for the piston 24 in its inwardwise direction of stroke.

A cylinder head or cap 38 loosely receives the piston rod 14 in an opening 40 in the cap, and the cap has an enlarged outer portion carrying a set of threads 42 and formed with a pair of spaced apart spanner wrench sockets 44. A longitudinally extending breather passage 46 in the cap 38 enables air trapped between the cap and the piston 24 to escape freely and to be reintroduced in the space between the cap and piston as the piston reciprocates.

The threads 42 of the cap fit loosely in an internal set of threads formed in a counterbored portion 48 of the cylinder located at the mouth of the bore 34. A spanner tool, not shown, is fitted in the sockets 44 of the cap and is turned to adjust the longitudinal position of the cap by rotating it in its threads. The wall of the counterbored portion 48 is drilled and tapped to receive a nylon button 50 and a set screw 52 which sets the button in compression against threads 42 to lock the cap against rotation in the threads.

The inner end of the cap 38 forms a piloting portion 54 of cylindrical shape which fits in tight surface contact with the bore 34. The caps and cylinders are selectively assembled so that each piloting portion 54 is closely matched in dimensions to the bore of the cylinder 10; the surface finish of each is held to within approximately sixteen microinches in uniformity and the selection is made so that the clearance in the resulting interface of contact is maintained low and within closely held tolerances.

The longitudinally offset, inner extremity of the piloting portion 54 of cap 38 defines a squarely transverse, ring-shaped face 56 engageable by, and acting as a stop for the piston 24; the parallel piston faces 26 conform to complementary paths of revolution to the fixed, transverse faces 36 and 56 within the cylinder, and the latter faces 36 and 56 are both square to the bore 34 and precisely parallel to one another.

It is essential or at least highly desirable to have the length of the piloting portion 54 to be a magnitude which is a substantial proportion of the diameter of the portion 54, and also to have the diameter of the portion 54 almost equal to the inside diameter of the bore 34. Despite the fact that the threads 42 fit relatively loosely within the counterbored portion 48 of the cylinder, the lengthwise dimension of the piloting area of contact insures that the cap 38 will be coaxial with the bore 34 when the circumferential-wise dimension of the piloting area of contact is sufficient to enforce concentricity between the two.

In FIGURE 5, a cap within the cylinder 10 has an axis 152 which is not concentric with the axis 132 of the cylinder bore 34; that is to say, the piloting portion 154 is sufficiently long but the diameter is shown in greatly exaggerated fashion to be too short. Hence, the piloting portion can take an unwanted, cocked position shown by the dotted lines 154a wherein the fixed, transverse face presented by the cap assumes the dotted line position 156a which is not square with the bore 34.

A difficulty of a slightly different character is shown in FIGURE 6, again to exaggerated scale. The diameter of the piloting portion 254 is sufficient to force itself into concentricity with a cylinder bore 34, but the length of the portion 254 is too short to force the axes 252 and 232 of the respective cap and bore 34 into coaxial relationship. The fixed, transverse face 256 presented by the cap results in being not square with the bore 34, similarly to the result reached in FIGURE 5 preceding.

It is not essential in all cases that the piston seal 28 be provided, and this seal is omitted from the piston 324 shown in the embodiment of FIGURE 7. In other words, the finish and conformity of the piston face 26 to the transverse face 56 presented by the cap 38, make a satisfactory, flush, metal-to-metal seal and prevent the escape of fluid in a path along the piston rod 14 leading from the bore 34. The piston 324 has a slight freedom of lateral adjustment in the bore and seats itself solidly against the surface 56 as the piston moves into the position shown in solid lines in FIGURE 7.

The cylinders which have been described are of the single-acting type and are primarily intended, although not necessarily so, to be air-operated or, more generally, gas operated. If hydraulic fluids are substituted as the motive fluid, the action will be performed with slightly more power than with air or gases, but with the attendant risk of a leakage problem. Hence additional or more efficient seals may be required if oil or other hydraulic pressure fluid is applied to the cylinders.

In the embodiment of the invention shown in FIGURE 8, a double-acting, hydraulically operated cylinder 410 is provided. In addition to the inlet-outlet port 32, not shown, which is formed at the closed end of the cylinder 410, another inlet-outlet port 432 is provided in communication with the space between the cap 38 and the piston 24. Hydraulic fluid supplied through either one of the ports 32 and 432 causes the piston 24 to move and consequently to exhaust trapped fluid through the other of the ports. To prevent leakage, an O-ring seal 444 fitting in a groove in the piloting portion 454 forms a seal between the cylinder bore 34 and the cap 38. Another O-ring seal 442 is provided in an internal groove within the cap opening 440 to form a seal between the piston rod 14 and the cap 38.

The set of threads 42 enables the cap to be longitudinally adjustable, and the piston 24 reciprocates under pressure, all in the preceding manner described. Because of the seals 28, 442 and 444, the port 432 constitutes the sole means for supplying fluid to and exhausting fluid from the space between the piston 24 and the cap 38.

Following is an example of the dimensions and selection of tolerances of a piston and cylinder unit as shown according to FIGURE 1 preceding:

| | |
|---|---|
| Cylinder bore 34 nominal diameter | 0.750 inch. |
| Ring-shaped face 36 to be square to bore 34 | Within 0.0002" T.I.R. |
| Concentricity of O.D. W.R.T. bore 34 | Within 0.002" T.I.R. |
| Squareness of opposite piston faces 26 | Within 0.0002" T.I.R. |
| Concentricity of O.D. W.R.T. rod 14 | Within 0.002" T.I.R. |
| Piloting portion 54 and bore 34 | Matched fit with clearance between 0.0002" and 0.0007". |
| Threads 42 and threads in counterbore 48 | Minimum clearance of 0.006" at pitch line for nominal 0.875" diameter. |
| Fluid pressure | Range between 20 p.s.i. and 80 p.s.i., preferably 30 p.s.i. gage. |
| Length to diameter ratio of cap piloting portion 54 | 1 to 3. |

From the foregoing, it is seen that the tightness of the cap 38 in the bore 34 and its relative looseness within the adjacent counterbore is rather pronounced, with the clearance fit of the cap threaded portion 42 in the threads of the counterbore compared to the clearance fit of the smaller piloting portion 54 in the bore 34 being in the actual ratio of at least approximately 60 to 7. In the way intended when the piloting portion 54 makes tight surface contact with the wall of the bore, the threads 42 of the cap are accommodative thereto and the squeeze of the bore forces the ring-shaped terminal face 56 of the cap to be square with respect to the bore and the piloting portion 54 to be concentric therein.

Variations within the spirit and scope of the invention described are equally comprehended by the foregoing description.

What is claimed is:

1. Gage mechanism comprising a cylinder, a slideable piston in the bore thereof, a cylinder cap capping the head of said bore, said cylinder having a closed-end wall defining a fixed, transverse interior face engageable by the piston in moving from said cap in one direction of stroke in the bore of said cylinder, and means for adjusting said cylinder cap with respect to said cylinder for changing the effective length of the bore to afford a predetermined piston stroke, said adjusting means being carried by the cylinder and having clearance with respect to the cylinder, said cap defining a second, transverse interior face engageable by the piston at the opposite end of stroke, said cap having a piloting portion, said piloting portion and the piston arranged each one engaged with the same bore, and with the piloting portion having an extended surface and effecting tight, metal-to-metal contact with the bore whereby said transverse interior faces maintain precise parallelism with one another in all positions of adjustment of said cap.

2. In gage mechanism of the piston type, the combination of a cylinder having a bore for slideably receiving a piston, a cylinder cap capping the head of said bore, said cylinder having a closed-end wall defining a fixed, transverse interior face at one end of the stroke of the piston, means for adjusting the cylinder cap with respect to the cylinder and responsive to rotation of the cylinder cap for changing the effective length of the bore to afford a predetermined piston stroke, said adjusting means being rotatably carried by the cylinder and having clearance with respect to the cylinder, said cap defining a second, transverse interior face at the opposite end of piston stroke and having a piloting portion in tight extended surface contact with said bore whereby said transverse interior faces maintain parallelism with one another in all positions of adjustment of said cap, and means for rotating said cap to afford a predetermined length of stroke in the described manner.

3. Piston and cylinder mechanism comprising a cylinder member, a slideable piston in the bore thereof, and a rotatable cap member capping the head of said bore; said cylinder member having a closed-end integral wall presenting a fixed, transverse interior face engageable by the piston in moving from said cap member in one direction of stroke in the bore of said cylinder member; said rotatable cap member having a threaded portion fitting in threads in said cylinder member and operative when said members are relatively rotated for adjusting the effective length of the bore to afford a pre-determined piston stroke; said rotatable cap member presenting a second, transverse interior face engageable by the piston at the opposite end of stroke, and having a piloting portion in surface contact with the bore whereby said transverse interior faces maintain parallelism with one another in all positions of adjustment of said cap member, the threaded portion and the piloting portion of the cap member being of a differing diameter from one another, said threaded portion of the rotatable cap member having a loose fit in said threads and the piloting portion thereof being in tight surface contact with said bore, whereby said threads are accommodative thereto and the squeeze of said bore forces the second transverse interior face to be square with respect to said bore and the piloting portion concentric therein.

4. Piston and cylinder mechanism according to claim 3, the length to diameter ratio of said piloting portion being at least approximately 1 to 3.

5. Piston and cylinder mechanism according to claim 3, the threaded portion aforesaid of the cap member being of a larger diameter than the piloting portion thereof, the clearance fit of the threaded portion in the cylinder threads compared to the clearance fit of the piloting portion in the bore being in ratio to one another of at least approximately 60 to 7.

6. Piston and cylinder mechanism according to claim 3, including a transversely disposed locking element in said cylinder member engaged in compression against the threaded portion of the cap member for locking said members in position with a fixed effective length of stroke in said bore.

7. In adjustable stroke, gage mechanism of the piston type, the combination including a cylinder having a piston-receiving bore and a threaded counterbore at the head of said bore, a cylinder cap capping the head of said bore and having a longitudinally spaced apart, smooth cylindrical portion and a threaded portion, said threaded portion loosely fitting in the threads of said counterbore and operative when the cylinder and cylinder cap are relatively rotated for advancingly and retractively moving said cap with respect to said bore, said cylinder having an integral end wall having a protruding, transverse, interior face which presents a smoothly finished surface of revolution at one end of stroke in said bore, said cylinder cap having an end having a protruding, transverse, interior face which presents a smoothly finished surface of revolution at the opposite end of stroke in said bore, the cylindrical portion of said cylinder cap constituting a piloting portion in tight, extended surface contact with the bore whereby said transverse interior faces maintain parallelism with one another in a position of advanced or retracted movement of the cap with respect to said bore, and means for locking said cap and cylinder to fix the length of piston stroke in the bore between said parallel interior faces.

8. The combination according to claim 7, and further including a coaxially extending piston rod opening formed in said cylinder cap, a slideable piston in said bore having a piston rod protruding externally through the piston rod opening in said cylinder cap and loosely fitting therein, said piston at opposite ends having raised, transverse faces presenting smoothly finished, complementary surfaces of revolution to said parallel interior faces and engageable therewith as stopping means to accurately stop the piston at its opposite ends of stroke, said bore being of uniform diameter and common to the cylindrical piloting portion and the piston, said cap establishing a loose fit as aforesaid between the threads of its threaded portion and the threads of said counterbore so as to accommodate to the squaring and centering action of the tightly fitting, cylindrical piloting portion thereof.

9. The combination according to claim 8, the face-to-face engagement of the piston at each end with the complementary, surface-of-revolution face of the stopping means at that end establishing substantially fluid-tight, surface sealing contact therewith, and constituting the sole seals between the moving parts of said mechanism.

10. A short, precision stroke positioning device comprising: a bipartite cylinder consisting of the cylinder part proper and a head part having locking means holding the parts against unwanted separation; and a one-piece piston rod and piston slideably received therein, with the piston portion in the main bore of the cylinder proper and with the rod portion extending to an external point through an opening in the head part of the cylinder; said head part at the inner end thereof having an axially and circumferentially smooth, select fit, piloting portion tightly fitting against the surrounding surface of the main bore, said piloting portion presenting a transverse surface confronting the piston and precisely arranged centered to the main bore and square to the piston, said head part having an enlarged outer end threadedly fitting in a threading head counterbore provided in the cylinder part proper, the fit of said head part in its threads affording longitudinal adjustment of said transverse surface to establish a stopping point for the piston rod and piston, and being a loose fit for accommodative purposes of the outer end of said head part, said centering and squaring action being solely controlled by the tight inner end.

References Cited in the file of this patent
UNITED STATES PATENTS

| | | |
|---|---|---|
| 2,533,421 | Bodnar | Dec. 12, 1950 |
| 2,716,965 | Klamp | Sept. 6, 1955 |
| 2,776,481 | Northcutt | Jan. 8, 1957 |
| 2,848,254 | Millar | Aug. 19, 1958 |
| 2,918,040 | Lieser | Dec. 22, 1959 |